US007898387B2

(12) United States Patent
Jalil et al.

(10) Patent No.: US 7,898,387 B2
(45) Date of Patent: Mar. 1, 2011

(54) PORTABLE REMOTE TRANSMITTER TO REMOTELY CONTROL A VEHICLE FUNCTION

(75) Inventors: Nashat K Abdel Jalil, Auburn Hills, MI (US); Grigory Yezersky, Farmington Hills, MI (US); Gerald Cilibraise, Livonia, MI (US); Stephen J Buckley, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 903 days.

(21) Appl. No.: 10/349,258

(22) Filed: Jan. 22, 2003

(65) Prior Publication Data

US 2004/0140883 A1 Jul. 22, 2004

(51) Int. Cl.
*G06F 7/04* (2006.01)

(52) U.S. Cl. .................... 340/5.64; 340/5.23; 340/5.65; 340/5.72

(58) Field of Classification Search ................ 340/5.64, 340/5.61, 5.62, 5.63, 5.72, 825.69, 425.5, 340/5.23, 5.26; 307/10.1, 10.2
See application file for complete search history.

(56) References Cited

U.S. PATENT DOCUMENTS

| | | | | |
|---|---|---|---|---|
| 4,688,036 A | | 8/1987 | Hirano et al. | |
| 4,942,393 A | * | 7/1990 | Waraksa et al. | 340/5.62 |
| 5,231,273 A | * | 7/1993 | Caswell et al. | 235/385 |
| 5,388,691 A | | 2/1995 | White | |
| 5,442,341 A | * | 8/1995 | Lambropoulos | 340/5.26 |
| 5,677,665 A | | 10/1997 | Amano et al. | |
| 5,798,715 A | * | 8/1998 | Saperstone | 341/22 |
| 5,955,981 A | * | 9/1999 | Rangan | 341/173 |
| 6,181,254 B1 | | 1/2001 | Vogele | |
| 6,198,481 B1 | * | 3/2001 | Urano et al. | 715/835 |
| 6,366,198 B1 | * | 4/2002 | Allen et al. | 340/426.17 |
| 6,396,389 B1 | | 5/2002 | Nakano et al. | |
| 6,449,492 B1 | * | 9/2002 | Kenagy et al. | 455/550.1 |
| 6,549,133 B2 | * | 4/2003 | Duncan et al. | 340/573.3 |

* cited by examiner

*Primary Examiner*—Vernal U Brown
(74) *Attorney, Agent, or Firm*—Ralph E. Smith

(57) ABSTRACT

A vehicle function switch and a controller electrically are connected together. The controller has a passive mode of operation in which the controller is not responsive to activation of the vehicle function switch to transmit a vehicle function signal. The controller also has an active mode of operation in which the controller is responsive to activation of the vehicle function switch to transmit a vehicle function signal. A mode switch is associated with the controller and adapted to cause the controller to change from the passive mode of operation to the active mode of operation.

9 Claims, 3 Drawing Sheets

PORTABLE REMOTE TRANSMITTER TO REMOTELY CONTROL A VEHICLE FUNCTION

FIELD OF THE INVENTION

The present invention relates to portable remote transmitters to remotely control a vehicle function.

BACKGROUND OF THE INVENTION

Portable remote transmitters are recently commonly placed on a key chain for use in remotely controlling various vehicle functions. For example, these key chain transmitters include multiple vehicle function switches to remotely accomplish such activities as, for example, locking the doors of a vehicle, unlocking the doors of the vehicle, opening a trunk, and/or operating a powered door.

One problem which has been associated with such portable transmitters is that the switches include buttons which are prone to inadvertent actuation. Thus, vehicle function signals are prone to being inadvertently transmitted by the portable transmitter. Such inadvertent actuations can occur as the transmitter is placed in the pocket or purse of a user, as the user performs other activities with the portable transmitter in his or her hands, or as a result of being compressed while in a pocket or purse of the user. Therefore, a portable transmitter which significantly reduces the possibility of such inadvertent vehicle function signal transmissions is desirable.

SUMMARY OF THE INVENTION

In accordance with one aspect of the present invention, a portable remote transmitter for use in transmitting a signal to remotely control a vehicle function is provided. The transmitter includes a vehicle function switch and a controller electrically connected with the vehicle function switch. The controller has a passive mode of operation in which the controller is not responsive to activation of the vehicle function switch to transmit a vehicle function signal. The controller also has an active mode of operation in which the controller is responsive to activation of the vehicle function switch to transmit a vehicle function signal. A mode switch is associated with the controller and adapted to cause the controller to change from the passive mode of operation to the active mode of operation.

In accordance with another aspect of the present invention, portable remote transmitter for use in transmitting a signal to remotely control a vehicle function with a vehicle function switch is provided. A transmitter circuit is associated with the vehicle function switch and adapted to transmit a vehicle function signal in response to activation of the vehicle function switch. A mode switch is associated with the transmitter circuit and adapted to disable the transmitter circuit from transmitting a vehicle function signal in response to an activation of the vehicle function switch.

In accordance with yet another aspect of the present invention a portable remote transmitter for use in transmitting a signal to remotely control a vehicle function is provided. The transmitter has an active mode of operation in which the transmitter is adapted to transmit a vehicle function signal in response to a particular activation activity. The transmitter also has a passive mode of operation in which the transmitter is adapted to change to the active mode of operation in response to a different activation activity. The transmitter being further adapted, while in the passive mode of operation, to avoid transmitting a vehicle function signal in response to the particular activation activity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
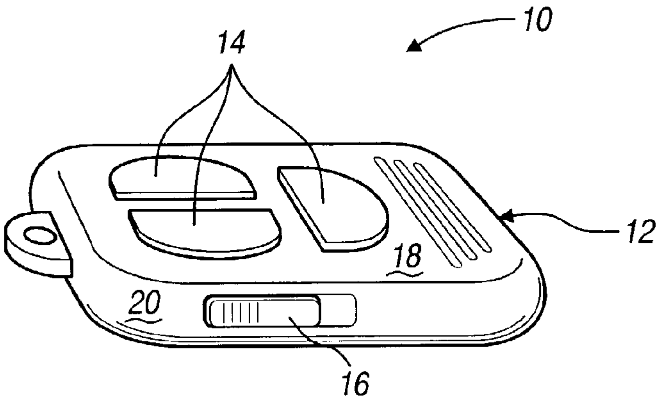
FIG. 1 is a perspective view of a preferred embodiment of a portable remote transmitter for use in transmitting a vehicle function signal to remotely control a vehicle function.

Referring to FIG. 1, a preferred embodiment of a portable remote transmitter for use in transmitting a vehicle function signal to remotely control a vehicle function, indicated generally as 10, is illustrated. The transmitter generally includes a housing 12 having several vehicle function switches 14 and a mode switch 16. The housing 12 has a plurality of side surfaces 18, 20 which together encase the portable remote transmitter circuitry. The vehicle function switches 14 are located on a top side surface 18 and the mode switch 16 is located on an intermediate side surface 20 which is generally adjacent and orthogonal to the top side surface 18. The vehicle function switches 14 are adapted, for example, to transmit signals to lock the doors, unlock the doors and open the trunk, respectively.

Figure 2:
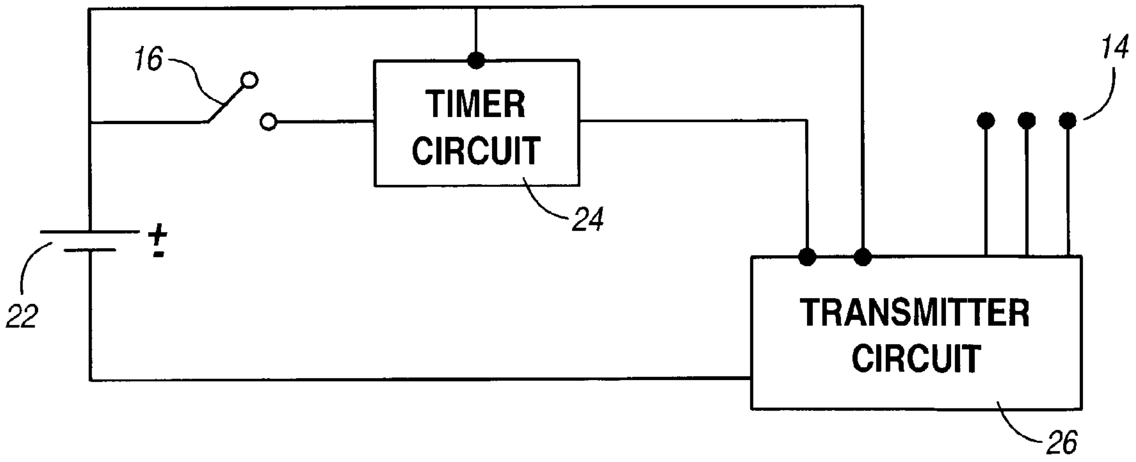
FIG. 2 is a circuit diagram illustrating the circuitry of the preferred portable remote transmitter of FIG. 1.

Referring to FIGS. 1 and 2, a general circuit diagram of the circuitry of the portable remote transmitter 10 is provided. A power supply 22 is electrically connected to a controller for the transmitter 10. Specifically, the power supply 22 is connected to the mode switch 16 button which provides input to a timer circuit 24. Upon activation of the mode switch 16 button, a timer circuit 24 begins timing a predetermined time period. During this period, the transmitter is active. As used herein, "activation" means manually manipulating a switch. Thus, activation includes manually moving a switch into an open or into a closed position (or into an off or an on position) and includes manually maintaining the switch in a position and/or permitting a biased switch to return to a home position by manually releasing the switch. Of course, the switch may alternatively be moved into either of these positions by non-manual means (e.g., by circuitry or software).

The mode switch 16 button of this embodiment is a sliding switch which is biased to the open position. Thus, the user activates the mode switch 16 button by a sliding activation activity which slides the mode switch 16 against the bias to the closed position. Closing the switch initiates the timer of the timer circuit 24. During this predetermined time period, the portable transmitter 10 is in an active mode. As such, activation of a vehicle function switch 14 by a downward pressing activity results in the transmitter circuit 26 transmitting a corresponding vehicle function signal for receipt by a receiver of the automobile.

Upon the lapse of the predetermined time period, the timer circuit 24 output disables the transmitter circuit 26 and the controller enters a passive mode. As such, the activation of a vehicle function switch 14 will not result in any signal being transmitted. Thus, the timer circuit 24 is adapted to operate as a switch which allows an enable signal to flow to the transmitter circuit 26 for a predetermined time period after the mode switch 16 button has been activated. The predetermined time period may be any reasonable time period in which to use the portable transmitter 10. Preferably, the predetermined time period is less than about 10 seconds; more preferably, less than about 5 seconds; and even more preferably, less than about 3 seconds.

Figure 3:
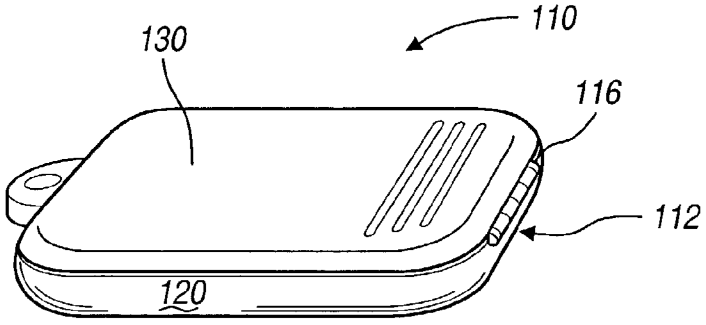
FIG. 3 is a perspective view of another preferred embodiment of a portable remote transmitter with a flip cover in a closed position.
Figure 4:
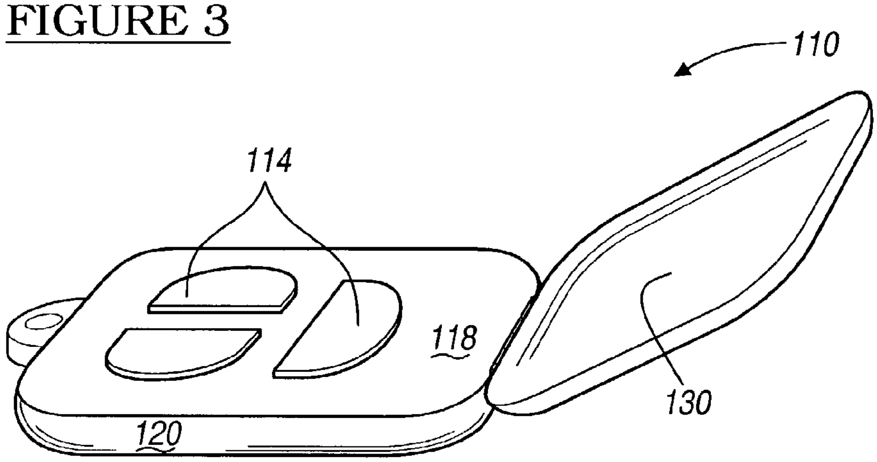
FIG. 4 is a perspective view of the portable remote transmitter of FIG. 4 with the flip cover in an open position.

Referring to FIGS. 3 and 4, another preferred embodiment of a portable remote transmitter 10 is provided. The transmitter 110 includes a housing 112 and a flip cover 130 which, in an open position, enables access to the vehicle function switches 114. Thus, as seen in FIG. 4, the cover 130 allows the vehicle function switches 114 to be manually activated. As seen in FIG. 3, the flip cover 130 also has a closed position in which the cover 130 restricts access to the vehicle function switches 114. Thus, with the cover 130 in a closed position, the probability of accidental activation of the vehicle function switches 114 is essentially eliminated.

The mode switch 116 is associated with the hinge of cover 130 to activate the mode switch 116 by a rotation activity which moves it into an on position when the cover 130 is open. In addition, the cover 130 is associated with the mode switch 116 to activate the mode switch 116 by moving it into an off position when the cover 130 is closed. As used herein, the "on position" corresponds to the active mode and the "off position" refers to the passive mode of operation. Consequently, activation of the vehicle function switches 114 by a downward pressing activity will only transmit a corresponding vehicle function signal when the cover 130 is in the open position. If a vehicle function switch 114 is activated while the cover 130 is in a closed position, a corresponding vehicle function signal will not be sent. Associating the mode switch 116 with a cover 130 enables a user to activate a vehicle function switch 114 to transmit a corresponding signal without holding down both the buttons of the vehicle function switch 114 and the mode switch 116 simultaneously.

Figure 5:
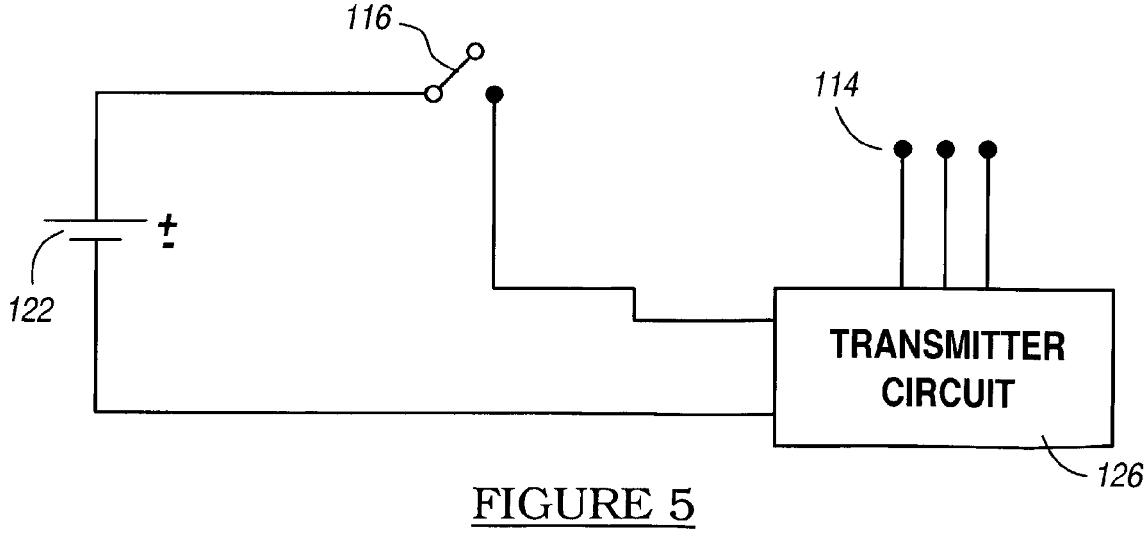
FIG. 5 is a circuit diagram illustrating the circuitry of the preferred portable remote transmitter of FIGS. 3 and 4.

Referring to FIG. 5, a general circuit diagram of the circuitry of the portable remote transmitter 110 is provided. A power supply 122 is electrically connected to a controller for the transmitter 110. Specifically, the mode switch 116 is located between the power supply 122 and the vehicle function switches 114 which feed power to the transmitter circuit 126 upon their activation. Thus, when the cover 130 is closed, the mode switch 116 is in an open position the transmitter circuit 126 is disabled. In contrast, when the cover 130 is open, the vehicle mode switch 116 is closed and the transmitter circuit 126 is enabled. As such, activation of a vehicle function switch 116 with the cover 130 open results in the transmission of a corresponding vehicle function signal.

As a result, the controller is adapted to determine if the mode switch 116 is in the closed, or active mode position. In this embodiment, this corresponds to the open position of the cover 130 and the closed position of the mode switch 116. If the mode switch 116 is in the active position, the controller is adapted to respond to activation of the vehicle function switches 114 to transmit a corresponding vehicle function signal. If the mode switch 116 is in the passive position, the controller is adapted to ignore any possible activation of the vehicle function switches 114. In this embodiment the passive position of the mode switch 116 corresponds to the closed position of the cover 130.

Figure 6:
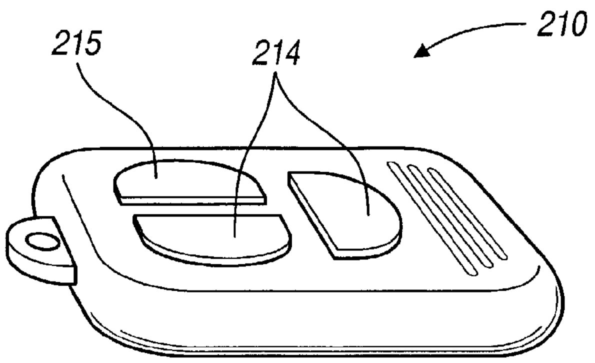
FIG. 6 is a perspective view of yet another preferred embodiment of a portable remote transmitter.
Figure 7:
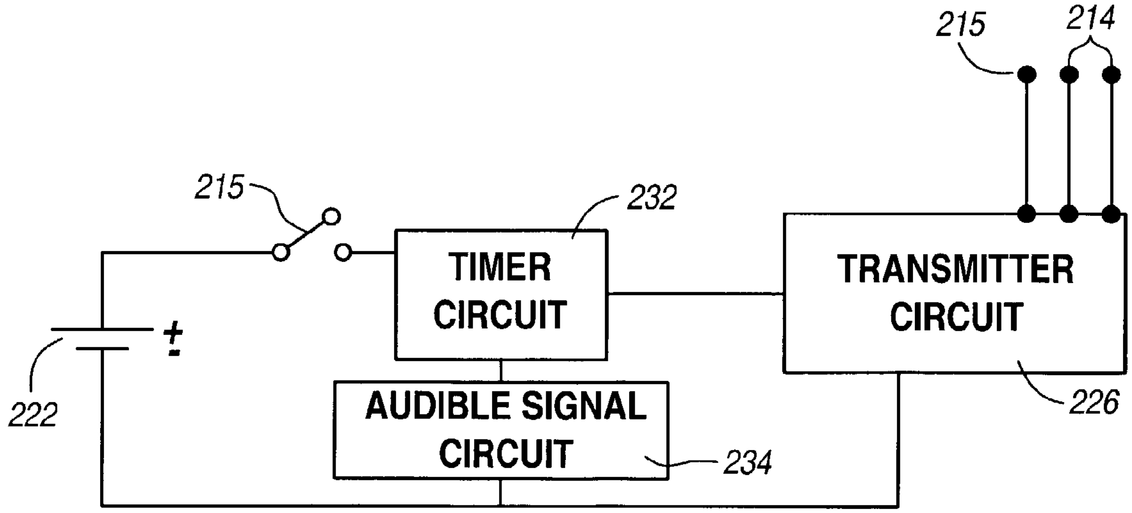
FIG. 7 is a circuit diagram illustrating the circuitry of the preferred portable remote transmitter of FIG. 6.

Referring to FIGS. 6 and 7, yet another preferred embodiment of a portable remote transmitter 210 is provided. In this preferred embodiment, the mode switch and one of the vehicle function switches (i.e., the door lock switch) are associated with the same mechanical switch 215. The door lock switch 215 is wired to a timer circuit 232 which is adapted to toggle the transmitter mode between the active mode and the passive mode each time the switch 215 is activated by the activity of holding it down for a predetermined period of time. Thus, the timer circuit 232 operates as a switch which moves between an active position, where the transmittal circuit 226 transmits vehicle function signals from the vehicle function switches 214, 215, and a passive position, in which the transmitter circuit 226 does not process the vehicle function signals received.

The timer circuit 232 does not respond to activation of the door lock switch 215 to change the internal mode switch from the active to passive mode, or visa versa, unless the door lock switch 215 is maintained in an activated state for at least a predetermined period of time. If the timer circuit 232 detects that the door lock switch 215 has been maintained in an activated state for the predetermined period of time, then the controller will toggle the mode between the active and passive transmitter mode. A preferred predetermined time period in which the switch 215 must be maintained in an activated state in order to result in a change of mode status is less than about 3 seconds; more preferably, less than about 2 seconds; and even more preferably, less than about 1 second.

As a result, when in the passive mode, the controller is adapted to ignore activation of any vehicle function switch 214, 215 with respect to transmitting a corresponding vehicle function signal. Activation of the door lock vehicle function switch 215, however, initiates the timer of the timer circuit 232. If the timer circuit 232 determines that the vehicle function switch 215 remains in an activated state for the predetermined time period, then the controller moves to the active state. As a result of the change of states, the audible signal circuit 234 generates a short beep to signify the change of states. Thus, the user is notified of any inadvertent change in mode status of the transmitter 210. In addition, the controller now activates the transmitter circuit 226 in response to any subsequent activation of a vehicle function switch 214, 215 by any short downward pressing activity so that a corresponding vehicle function signal is transmitted.

The portable transmitter 210 remains in this active state until the controller detects that the door lock function switch 215 has been maintained in an activated state for the predetermined period of time. Activation of the door lock function switch 215 results in a vehicle function signal being transmitted to lock the doors of the automobile. Activation of the door lock function switch 215 also starts the timer circuit 232 timing the period of activation. Upon detecting that the period of activation of the door lock function switch 215 reaches the predetermined time period, the transmitter 210 is toggled into the passive mode and the audible signal circuit 234 generates an audible beep to signify the change in states of the transmitter mode. When in this mode, the controller ignores any subsequent activation of the vehicle function switches 214,

215 with respect to transmitting a corresponding vehicle function signal as discussed above.

Of course, many possible modifications to the above described embodiments will be apparent to those skilled in the art. For example, with respect to the preferred transmitter embodiment of FIGS. 3 and 4, the cover could be activated by a sliding action instead of the described flip action activity. With respect to the preferred transmitter embodiment of FIGS. 6 and 7, an additional timer circuit, similar to the timer circuit of FIG. 2, may additionally be provided to automatically return the transmitter back into the passive mode after a predetermined period of time. In addition, although the principles of the invention are described with respect to electrical circuitry, software can alternatively be utilized to provide the various switches and/or modes.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A portable remote transmitter for use in transmitting a signal to remotely control a vehicle function, comprising:

a vehicle function switch;

a transmitter circuit associated with the vehicle function switch and adapted to transmit a vehicle function signal in response to activation of the vehicle function switch; and a controller associated with the transmitter circuit and adapted to selectively activate the transmitter circuit to allow transmission of a vehicle function signal upon activation of the vehicle function switch, the controller being further adapted to deactivate the transmitter circuit and to ignore any activation of the vehicle function switch.

2. A portable remote transmitter according to claim 1, wherein the controller is adapted to respond to successive activations of a controller input by alternatively enabling and disabling the transmitter.

3. A portable remote transmitter according to claim 1, further comprising a timer circuit associated with the controller and adapted to deactivate the transmitter circuit upon the lapse of a predetermined period of time from a particular activation movement in relation to the transmitter.

4. A portable remote transmitter according to claim 1, further comprising a timer circuit associated with the controller and adapted to deactivate the transmitter upon a lapse of a predetermined period of time in which a particular manual activation of the transmitter is maintained.

5. A portable remote transmitter according to claim 1, wherein the controller is adapted to respond to a particular activation movement and wherein the vehicle function switch is adapted to respond to a different activation movement.

6. A portable remote transmitter according to claim 1, further comprising a housing having a plurality of side surfaces and wherein the vehicle function switch is located on one of the plurality of side surfaces and a controller input electronically connected to the controller is located on another of the plurality of side surfaces.

7. A portable remote transmitter according to claim 6, wherein the one of the plurality of side surfaces is generally orthogonal to the other of the plurality of side surfaces.

8. A portable remote transmitter according to claim 1, further comprising a housing having a cover moveable into a closed position covering the vehicle function switch and movable into an open position enabling manual access to the vehicle function switch, the cover being associated with the controller and adapted to alternately activate the transmitter circuit upon moving the cover into the open position, the closed position, or into both positions.

9. A portable remote transmitter according to claim 1, further comprising a timer circuit associated with the controller adapted to enable the transmitter circuit to transmit a vehicle function signal in response to activation of the vehicle function switch until a predetermined period of time from said activation and to thereafter disable the transmitter circuit until the controller is reactivated.

* * * * *